March 19, 1968   A. BÖHME   3,373,659
TRACING MECHANISM FOR DUPLICATING MACHINE
Filed Jan. 17, 1966   2 Sheets-Sheet 1

INVENTOR
Alexander Böhme

BY Bailey, Stephens and Huettig
ATTORNEYS

March 19, 1968  A. BÖHME  3,373,659
TRACING MECHANISM FOR DUPLICATING MACHINE
Filed Jan. 17, 1966  2 Sheets-Sheet 2

INVENTOR
Alexander Böhme

BY Bailey, Stephens and Huettig
ATTORNEYS

United States Patent Office 3,373,659
Patented Mar. 19, 1968

3,373,659
TRACING MECHANISM FOR
DUPLICATING MACHINE
Alexander Böhme, Langen, near Frankfurt am Main, Germany, assignor to Nassovia Werkzeugmaschinenfabrik G.m.b.H., Frankfurt am Main, Germany
Filed Jan. 17, 1966, Ser. No. 521,145
Claims priority, application Germany, Jan. 30, 1965, N 26,145
5 Claims. (Cl. 90—62)

ABSTRACT OF THE DISCLOSURE

A measuring ring is turnably supported on the tracer of a duplicating tool machine and is engaged by an electrical roller contact on a measuring head. The turntable support of the ring permits movement of this advance control with respect to the tracer around each of two axes extending at right angles to each other.

This invention relates to a tracing mechanism for a duplicating tool machine which operates with an advance control mechanism and is particularly directed to the connection between the advance control mechanism and the tracer.

Heretofore, a well-known duplicating machine has been constructed having an advance control mechanism operating in connection with a switching means engaged with the tracer. The switching means includes a measuring ring fastened to the tracer and a measuring head engaging the ring and driven by a reversing gear so that an electrical contact is made or broken between the ring and the head by the outward movement of the tracer and thus the measuring head is driven either clockwise or counterclockwise depending upon such tracer movement. The measuring ring follows the movement of the tracer by means of spring pressure forcing it into a constantly eccentric position with respect to the measuring head. The tracer is thus in continuous contact with the pattern and the direction of the advancing force for the machine tool is constantly and automatically adjusted according to the tangential contact between the tracer and the pattern. The advance control mechanism and its drive are rotatably mounted about the axis of the tracer. This makes it possible to trace the pattern with a line tracing process by positioning the advance control mechanism in the coordinates of the horizontal plane as determined by scale markings on the machine. It is not possible to rotate the advance control mechanism around an axis lying at right angles to the longitudinal axis of the tracer and therefore a pattern cannot be contour traced in the horizontal plane.

Another known duplicating milling machine has a hydraulically operating advance control mechanism which is composed of three advance control pins mounted at the upper end of the tracer and extending respectively in the direction of the space coordinates and one valve for each of the pins having a piston which forms a hydraulic switch as the control mechanism is driven either clockwise or counterclockwise. Despite a few disadvantages, as, for example, a tilting momentum can occur at the control pins, it is possible to trace the pattern in both line tracing and contour tracing on two coordinates in a horizontal plane with an advance control mechanism. However, considerable difficulties arise when, for example, the line direction must be changed or the machine changed from line tracing to contour tracing. In such cases, the position of the advance control mechanism must be refitted from one space coordinate to another which is time consuming and clumsy. Also, it is not possible to adjust the direction of tracing to any chosen direction of the scale markings on the machine.

The object of this invention is to produce a mechanism which avoids the heretofore stated disadvantages. In this invention, the advance control mechanism for a duplicating milling machine is provided with means for supporting the advance control mechanism with respect to the tracer so that the advance control mechanism can be pivoted around each of two axes which intersect each other at right angles and which can be fixed in any chosen position. The supporting means includes a support mounted on the upper end of the tracer for rotation around the longitudinal axis of the tracer. The advance control mechanism is pivotally supported on the support for rotation on an axis extending at right angles to the axis of the tracer. The support is composed of a bifurcated member to which the advance control mechanism is pivotally connected by pivot pins. This permits a new design to be used for the construction of the advance control mechanism. For example, the advance control mechanism can be composed of a measuring ring and a measuring head rotating in the ring to form an electrical switch. The measuring ring is pivotally supported in the bifurcated member so as to be movable at right angles to the axis of the tracer. The electrical switching means so formed permits the driving of the reversing gear for the measuring head without any graduating steps. The measuring head rotates at about 50 cycles per second in the measuring ring until the switch contact is opened by means of an outward movement of the tracer. This then reverses the rotation of the measuring head by way of an electronic control and such continues until the advancing force once again forms a predetermined angle of tangential contact between the tracer and the newly presented face of the pattern. Then the measuring head is constantly rotating until a change in contour of the pattern produces a new outward movement of the tracer and accordingly causes a new adjustment of the measuring head.

Moreover, it is possible that any other advance control mechanism, such as a hydraulically driven one, can be provided with the support mechanism of this invention. For example, a measuring head can be used which is driven by a hydraulic motor and which would use a hydraulic valve whose piston forms a hydraulic switch in conjunction with the measuring ring. The measuring ring is supported in the bifurcated means of this invention.

Also, the machine of this invention can have a degree scale marked on the housing of the tracer and the housing of the advance control mechanism, the scales having corresponding readings in order to adjust the advance control mechanism for any desired direction of tracing whether longitudinal, transverse or vertical or in any other direction between the vertical, horizontal and transverse axes. Clamping means extend through the tracer housing into the support and through the advance control mechanism housing for holding the latter in any desired position.

The means by which the objects of the invention are obtained are described more fully with reference to the accompanying schematic drawings in which.

Figure 1:
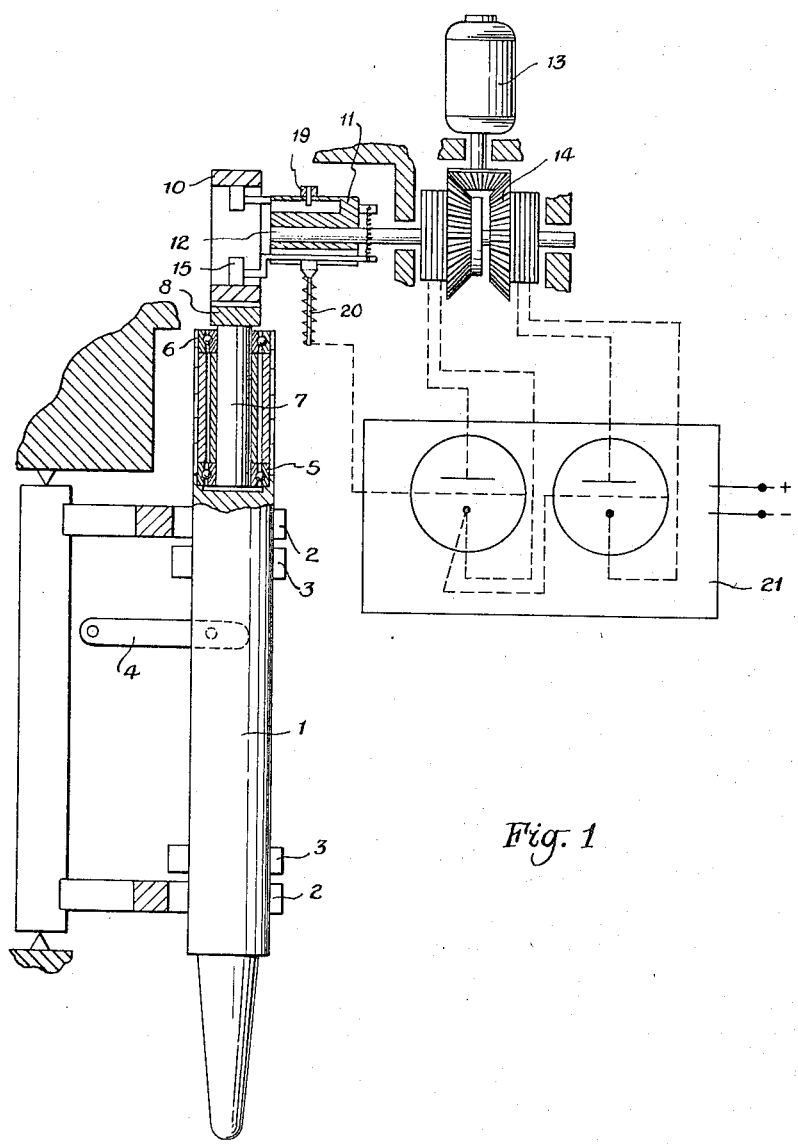
FIGURE 1 is a front view partly in section of the advance control mechanism of this invention.

As shown in FIGURE 1, the tracer 1 is movable in planes parallel to the X, Y and Z axes by being held by the fork-like levers 2, 3 and 4 and the corresponding outward movement of the tracer is transmitted by means of hydraulic slide valves arranged between the ends of the fork-like levers. This is a conventional structure which has not been illustrated in the drawings for purposes of simplicity. The amount and direction of the slide valves as moved by the tracer initiates the advance movement of the operating sled or table.

Roller bearings 5 and 6 in the upper end portion of tracer 1 rotatably hold the bearing pin 7 of a support 8 containing pivot pins 9 for the attachment of the advance control mechanism. This mechanism is composed of a measuring ring 10 held by the pivot pins 9 in the bifurcated support 8, note FIGURE 2. A measuring head 11 extends through ring 10 and the ring and head form an electrical switch. The shaft 12 of head 11 is driven clockwise or counterclockwise by a motor 13 through an electromagnetic reverse coupling 14. Head 11 which produces the advance control force has a pressure roller or cylinder 15 in order to bring the measuring ring into a position eccentric to its axis in the conventional manner in order to position tracer 1 through pivot pins 9 into the advance position with regard to the tool.

Along with the two support rollers 16 and 17, the measuring head 11 is also provided with a contact roller 18 which is electrically connected to a collecting ring 19 surrounding the measuring head and from which contact 20 receives the electrical current. This is a switching means for transmitting current to a control mechanism 21. This mechanism 21 responds to the outward movement of the tracer and the change in the direction of tangential contact between the tracer and pattern and initiates the clockwise or counterclockwise rotation of the measuring head 11. This continuously ensures that a certain angle is maintained which sets the direction of the advance force as shown by the arrows in FIGURE 2 with respect to the tangential contact between the tracer and pattern.

In order to be able to trace automatically a pattern in the various directions of the X–Y–Z axes, the advance control mechanism must be adjustable for the desired position so that the direction of the advance force can be effective in the direction of tracing. For this purpose, the advance control mechanism is installed in a housing, not shown, which can be rotated about 180° within the bifurcated end of support 8 on the axis formed by the pivot pins 9, which rotation lies at right angles and bisects the longitudinal axis of tracer 1, and the housing can also be rotated 360° around the axis of the tracer by reason of the bearings 5 and 6 which hold the pin 7.

The position of the advance control position is constantly fixed with respect to either or both of the rotating axes. For example, one operational position of the advance control mechanism can be adjusted around one rotation about the longitudinal axis of tracer 1 for line tracing in a longitudinal or transverse direction or even in any chosen direction lying between the X–Y coordinates of the horizontal. Another rotation around the pivot pins 9 extending radially to the axis of the tracer produces a position of the mechanism for contour tracing. Clamping bolts which are not shown in detail extend through the housing of the tracer onto pin 7 while other clamping bolts extend through the housing for the advance control mechanism to the bifurcated end of support 8 and/or the measuring ring so as to position the advance control mechanism.

Figure 3:
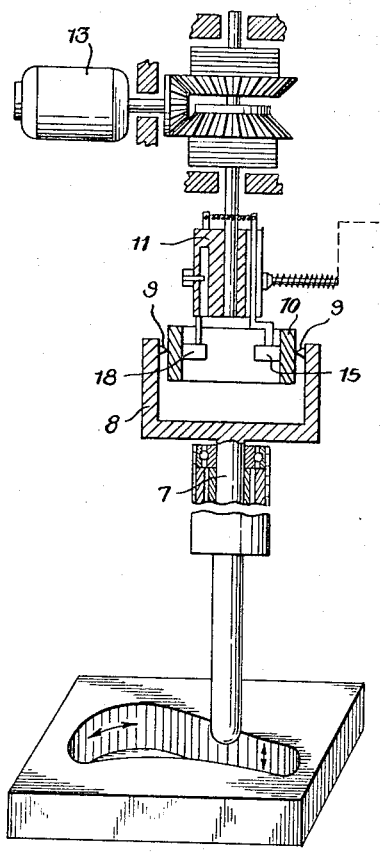
FIGURE 3 is a similar view of the advance control mechanism for tracing vertically.
Figure 2:
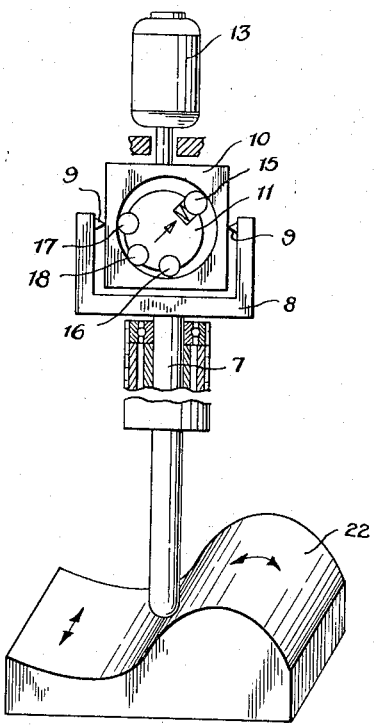
FIGURE 2 is a side view of FIGURE 1 with the advance control mechanism positioned for longitudinal tracing.

In FIGURE 2, the advance control mechanism is shown in a position corresponding to FIGURE 1 as seen in the side view of FIGURE 1. This position corresponds to a duplicating fraising in line tracing with the lines running in the longitudinal direction as shown by the pattern 22. On the other hand, FIGURE 3 shows the position of the advance control mechanism for contour milling. As shown, the advance control mechanism has been rotated around the pivot pins 9 so as to be in a vertical position.

Having now described the means by which the objects of the invention are obtained,

I claim:

1. In a duplicating tool machine comprising a tracer movable in all directions, an advance control means including switching means having a measuring ring joined to said tracer and movable means engaging said ring for being driven in a clockwise or counterclockwise direction as determined by said switching means upon outward movement of said tracer, the improvement comprising supporting means mounting said switching means and said advance control mechanism for movement with respect to said tracer around each of two axes extending at right angles to each other, and means for fastening said switching means and said advance control mechanism in any position on said axes.

2. In a machine as in claim 1, said supporting means comprising a support mounted at the upper end of said tracer for rotation around the longitudinal axis of said tracer, and pivot means mounting said switching means and said advance control means on said support for rotation at right angles to the longitudinal axis of said tracer.

3. In a machine as in claim 2, said support comprising a bifurcated member joined to the upper end of said tracer, and connected by said pivot means to said switching means.

4. In a machine as in claim 3, said ring being joined by said pivot means to said bifurcated member, and said movable means comprising a measuring head engaged in said ring.

5. In a machine as in claim 4, said means for fastening said switching means and said advance control mechanism comprising clamping means engaging said tracer and said bifurcated member for holding said switching means and advance control means in place, and scale markings on said machine for positioning said switching means and advance control means.

References Cited
UNITED STATES PATENTS 2,796,806    6/1957    Schlapp _____ 90—62
3,241,455    3/1966    Kohl _____ 90—62

GERALD A. DOST, *Primary Examiner.*